(12) United States Patent
Huang

(10) Patent No.: US 6,667,981 B1
(45) Date of Patent: Dec. 23, 2003

(54) METHOD OF PARTITIONING TRAFFIC AND PLACING ADD/DROP MULTIPLEXERS IN A STACKED RING NETWORK

(75) Inventor: Jennifer S. Huang, Richardson, TX (US)

(73) Assignee: WorldCom, Inc., Ashburn, VA (US)

( * ) Notice: Subject to any disclaimer, the term of this patent is extended or adjusted under 35 U.S.C. 154(b) by 0 days.

(21) Appl. No.: 09/343,824

(22) Filed: Jun. 30, 1999

(51) Int. Cl.[7] .............................................. H04L 12/28
(52) U.S. Cl. ........................................ 370/405; 370/258
(58) Field of Search ................................. 370/237, 238, 370/238.1, 258, 252, 255, 400–406, 535

(56) References Cited

U.S. PATENT DOCUMENTS 5,394,389 A * 2/1995 Kremer .................... 370/223
6,061,335 A * 5/2000 De Vito et al. ............ 370/258
6,370,145 B1 * 4/2002 Dally et al. ................ 370/400
6,396,852 B1 * 5/2002 Simmons ................... 370/535

* cited by examiner

Primary Examiner—Seema S. Rao
Assistant Examiner—Melanie Jagannathan

(57) ABSTRACT

The number of ring layers necessary to support the traffic in a stack ring network is determined, and the ring layers are divided into a first set of layers and a second set of layers. The interchange points between the first set of layers and the second set of layers are determined, and the traffic between the first set of layers and the second set of layers is allocated. The method subdivides each of the first and second sets of layers into a first set of layers and a second set of layers, and repeats the process of determining interchange points, allocating traffic, and subdividing the sets of layers until each set of layers consists of a single layer.

24 Claims, 5 Drawing Sheets

METHOD OF PARTITIONING TRAFFIC AND PLACING ADD/DROP MULTIPLEXERS IN A STACKED RING NETWORK

CROSS-REFERENCE TO RELATED APPLICATIONS

The present application is related to application Ser. No. 09/036,392, filed Mar. 6, 1998, titled Method for Optimal Routing in a Bi-Directional Line Switched SONET Ring, now U.S. Pat. No. 6,229,815, and application Ser. No. 09/131,538, filed Aug. 10, 1998, titled Method of and System for Managing a SONET Ring, now U.S. Pat. No. 6,389,015, both of which are assigned to the Assignee of the present application, and the disclosures of which are incorporated herein by reference.

FIELD OF THE INVENTION

The present invention relates generally to the field of communication network design, and more particularly to a method for partitioning traffic and placing add/drop multiplexers in a stacked ring network.

DESCRIPTION OF THE PRIOR ART

Modern digital telecommunication systems are built upon a network consisting of a plurality of nodes or cites that are interconnected by spans or transmissions facilities. A primary goal of telecommunications network design is to serve the demand in capacity between the nodes at the least cost, while maintaining an acceptable level of survivability in the event of failures. Two elements of cost in a network are transmission costs and equipment costs. Transmission cost is generally based upon the transmission distance. Equipment cost includes the cost of add/drop multiplexers, as well as the cost of other equipment.

Recently, there has been a move away from mesh topology for telecommunications networks toward a ring topology. In a bidirectional line switched ring, the demands on the ring are allowed to be routed on either side of the ring, and the capacity for all spans of the ring is required to be the same.

A ring topology offers advantages over a mesh topology, primarily in that a ring is self healing and therefore may be restored in a matter of milliseconds after a failure. However, if the routing of traffic is not done properly, then there can be large amounts of capacity not utilized and the total capacity deployed on the ring can be significantly higher than what is really required. It is therefore a problem to load traffic on a bidirectional line switched ring so that the number of ring layers can be minimized.

The traffic loading problem has two components. The first component is defined as the minimum capacity required for the ring. The second requirement is defined as an integer multiflow that satisfies both capacity and demand constraints. In application Ser. No. 09/036,392, filed Mar. 6, 1998, titled Method for Optimal Routing in a Bi-Directional Line Switched SONET Ring, the disclosure of which is incorporated herein by reference, there is disclosed a method of assigning capacity in routing flow in a SONET ring based upon topology and demand data.

Due to the fixed modularity in SONET transmission system, if the required capacity of the ring exceeds the modularity limit (e.g., OC48 or OC192), then demands on the ring need to be separated into several ring layers. The layering of demands and assignment of flow on overlapping ring layers presents several complicated optimization problems. One problem is to decompose the demands on to the several layers so that the number of ring layers required is minimized. Another problem is to layer the demand and assign the flow so that the total number of add/drop multiplexers (ADMs) can be minimized. The ADM problem is further complicated by the fact that an order for demand from a point A to a point B to traverse between ring layers 1 and 2 at an intermediate point C, ADMs need to be placed on both layers 1 and 2. A further problem is in minimizing the number of demands that traverse between different ring layers in order to ease network management.

The foregoing problems are further complicated if there is no internal time slot interchange function in the ADMs of the ring, which means that one unit of demand from point A to point B will need to be assigned to the same time slot on each intermediate span. In order to change time slot assignment at an intermediate point C, the unit of demand must be dropped from the originally assigned time slot at point C onto a digital cross connect and then reinserted in a new time slot at point C again. The drop and reinsert scenario should be minimized. Finally, in order to accommodate future growth, it is desirable that the time slot assignment be done so that the unused time slots in the ring are in contiguous locations.

Finding a single optimal solution to the above problems is a difficult task. To solve the combined problem of flow layering, ADM placement, and time slot assignment, is even more complicated since the different objectives mentioned above are often conflicting. Most heuristics attempt to address only a single objective, and do not provide a solution that is satisfactory in terms of achieving some guaranteed worst case bound. Because of the importance of this combined problem, a new method and system is needed to address the objectives by minimizing the number of rings and the number of ADMs.

SUMMARY OF THE INVENTION

The present invention provides a method for partitioning traffic and placing add/drop multiplexers in a stacked ring network. The method of the present invention determines the number of ring layers necessary to support the traffic and divides the ring layers into a first set of layers and a second set of layers. The method then determines the interchange points between the first set of layers and the second set of layers and allocates the traffic between the first set of layers and the second set of layers. The method subdivides each of the first and second sets of layers into a first set of layers and a second set of layers, and repeats the process of determining interchange points, allocating traffic, and subdividing the sets of layers for each set of layers until each set of layers consists of one layer.

The number of ring layers necessary to support the traffic is equal to the ceiling of the capacity required to support the traffic divided by the modularity of the ring. The capacity of the first set of layers is equal to the ceiling of half the number of layers multiplied by the modularity of the ring. The capacity of the second set of layers is equal to the floor of half the number of layers multiplied by the modularity of the ring. The method of the present invention determines the interchange points between the first set of layers and the second set of layers by determining, for each node of the ring, if the traffic terminating at that node is greater than the capacity of the first set of layers.

The method places one add/drop multiplexer on each set of layers at each interchange point. The method places one add/drop multiplexer on only the first set of layers at each terminating node of the ring determined not to be an interchange point. The method allocates traffic between the first set of layers and the second set of layers by assigning traffic terminating at each node determined not to be an interchange point to the first set of layers. The method assigns traffic terminating at each interchange point to the second set of layers until the capacity of the second set of layers is exhausted and then assigns the remaining traffic terminating at each interchange point to the first set of layers.

DESCRIPTION OF THE PREFERRED EMBODIMENT

Figure 1:
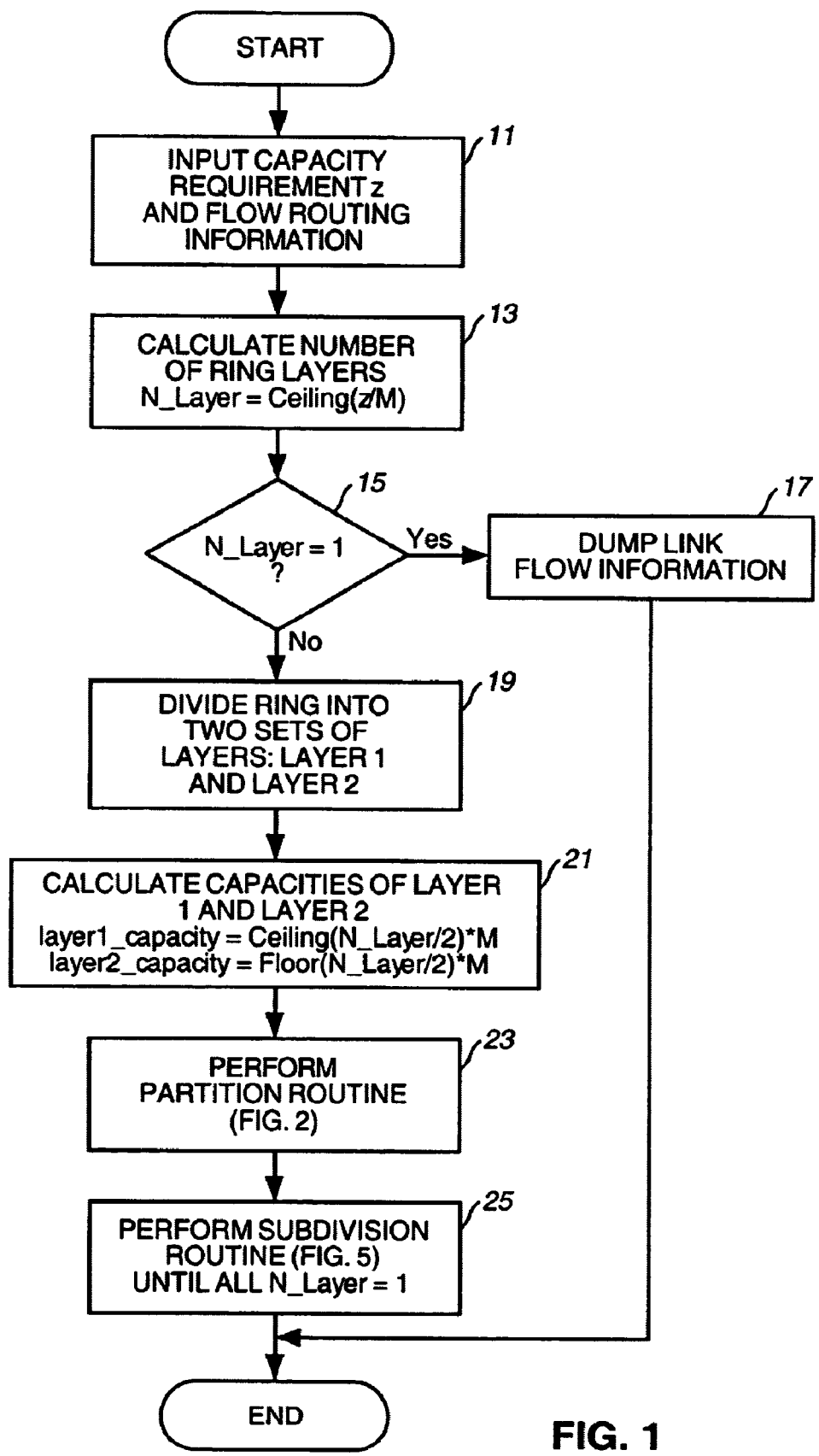
FIG. 1 is a high level flowchart of the preferred embodiment of the method of the present invention.

Referring now to the drawings, and first to FIG. 1, the capacity requirement z and flow routing information obtained, preferably by the method of application Ser. No. 09/036,392, filed Mar. 6, 1998, (the "'392 application"), is input at Block 11. The method of the '392 application provides the number of demands, preferably OC1 or STS1 units, carried on each span of the ring.

The method of the present invention calculates the number of ring layers N_Layer by dividing the capacity z by the modularity M of the ring and rounding up to the nearest integer value to determine the ceiling at block 13. For example, if the capacity requirement is 500 OC1 units and the modularity of the ring is OC48, then N_Layer is equal to 11 layers. If, at decision block 15, the number of layers N_Layer is equal to 1, then the method of the present invention dumps the link flow information, at block 17, and processing ends. If, at decision block 15, the number of layers is not equal to 1, then the method of the present invention divides the ring into two sets of layers, at block 19.

The first set of layers is referred to as layer 1 and the second set of layers is referred to as layer 2. The method of the present invention then calculates the capacities of layers 1 and 2 at block 21. The capacity of layer 1 is equal to the modularity of the ring multiplied by the ceiling of the number of layers calculated at block 13 divided by 2. The capacity of layer 2 is equal to the modularity of the ring multiplied by the floor of the number of layers calculated at block 13 divided by 2. Thus, in the example of a ring with 11 OC48 layers, layer 1 capacity is equal to 288 OC1 units and layer 2 capacity is equal to 240 OC48 units.

Figure 2:
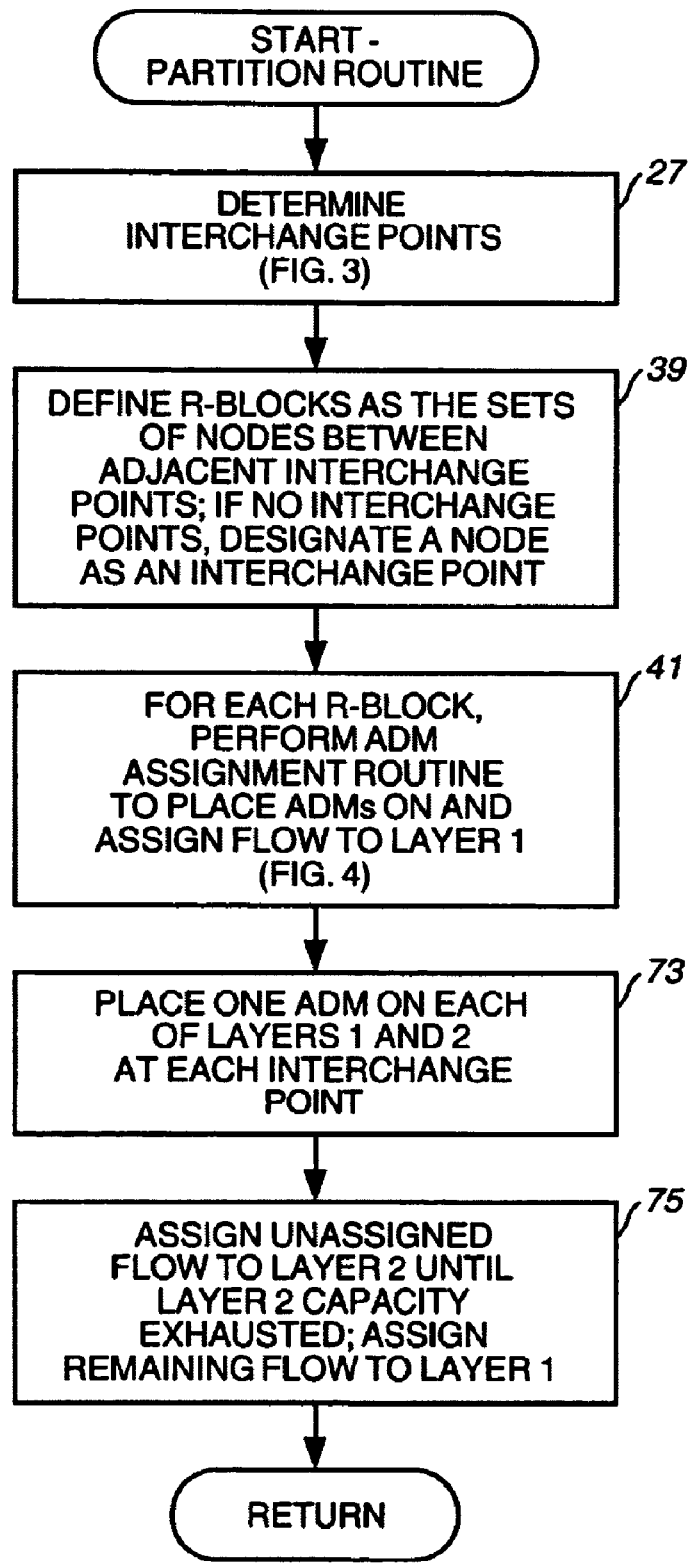
FIG. 2 is flowchart of the partition routine of the method of the present invention.
Figure 3:
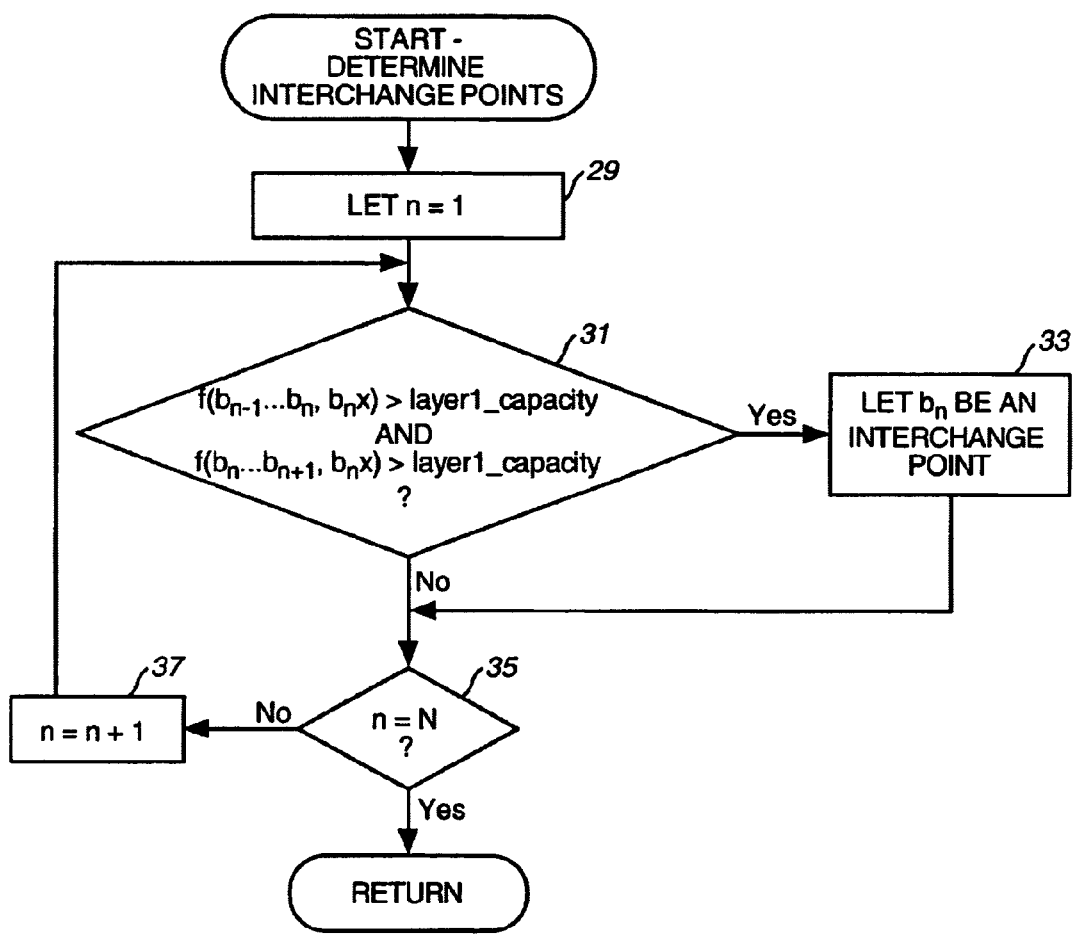
FIG. 3 is a flowchart of the process for determining interchange points according to the present invention.
Figure 4:
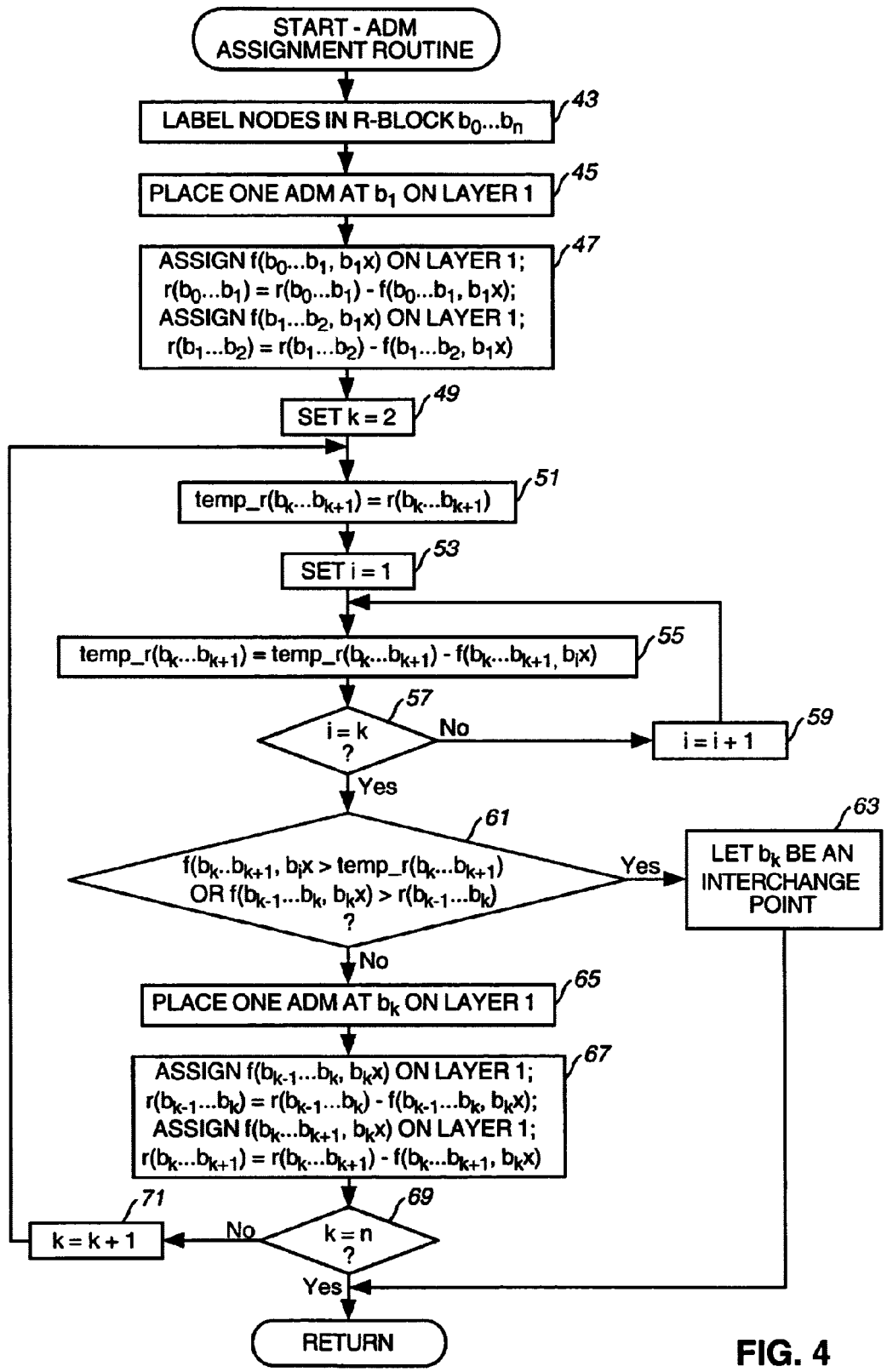
FIG. 4 is a flowchart of the add/drop multiplexer assignment routine of the present invention.

The method of the present invention then performs a partition routine, indicated generally at block 23 and shown in detail with respect to FIGS. 2–4. The partition routine determines interchange points, which are nodes at which traffic must be transferred between layers 1 and 2, places ADMs, and assigns flow to layers 1 and 2. After performing the partition routine, the method of the present invention performs a subdivision routine, indicated generally at block 25 and shown in detail with respect to FIG. 5, until each set of layers consists of a single layer, at which point processing ends.

FIGS. 2–4 illustrate the partition routine of the present invention. Referring to FIG. 2, the partition routine first determines the interchange points for the ring, as indicated generally at Block 27. A process for determining interchange points are shown in greater detail with respect to FIG. 3. An interchange point is a node at which more traffic terminates than the capacity of layer 1. Thus, traffic terminating at an interchange point must be carried on both layers 1 and 2. Accordingly, ADMs must be placed on both layers 1 and 2 at each interchange point.

Referring to FIG. 3, the method of the present invention determines interchange points by letting n=1, at block 29. Then, the method determines, at decision block 31, if the flow riding on the link between Node n−1 and Node n and terminating at Node n is greater than the layer 1 capacity and the flow riding on the link between Node n and Node n+1 and terminating at node n is greater than the layer 1 capacity. If so, Node n is an interchange point, as indicated at block 33. After processing at decision block 31, the method of the present invention tests, at decision block 35, if n=N. If not, the method lets n=n+1 at block 37, and processing returns to decision block 31. FIG. 3 processing continues until all terminating nodes of the network have been tested at decision block 31 and all interchange points have been located.

Referring again to FIG. 2, the method defines an r-block as the set of terminating nodes between adjacent interchange points, at block 39. If no interchange points are located according to FIG. 3 processing, the method of the present invention designates an arbitrary node as an interchange point, also as indicated at block 39. Then, the method of the present invention performs, for each r-block, an ADM assignment routine to place ADMs on, and assigned flow to, layer 1, as indicated generally at block 41, and shown in detail with respect to FIG. 4.

Referring now to FIG. 4, the ADM assignment routine labels the nodes in an r-block $b_0$–$b_n$, at block 43, where $b_0$ is an interchange point and $b_n$ is the next adjacent interchange point in a clockwise direction from $b_0$. Then the method of the present invention places one ADM at node $b_1$ on layer 1. Then, the method of the present invention assigns the flow riding on the link between nodes $b_0$ and $b_1$ and terminating at node $b_1$ on layer 1 and reduces the residual capacity of the link connecting nodes $b_0$ and $b_1$ by the amount of flow assigned to that link on layer 1. The method of the present invention assigns the flow riding on the link connecting nodes $b_1$ and $b_2$ and terminating at $b_1$ on layer 1 and reduces the residual capacity of the link connecting $b_1$ and $b_2$ by that amount of flow, as indicated at block 47. Then, the method of the present invention sets at index k equal to 2 at block 49. Then, the method of the present invention defines a temporary residual capacity of link connecting nodes $b_k$ and $b_{k+1}$ equal to the residual capacity of the link connecting nodes $b_k$ and $b_{k+1}$ at block 51. Then, the method sets index i=1 at block 53. Then, the method lets the temporary residual capacity of the link connecting nodes $b_k$ and $b_{k+1}$ equal to the temporary residual capacity of the link connecting nodes $b_k$ and $b_{k+1}$ reduced by the flow on link $b_k$ to be $b_{k+1}$ and terminating at nodes $b_i$, at block 55. The method then tests, at decision block 57, if index i is equal to index k. If not, the method lets i=i+1, at block 59 and returns to block 55.

Block 55 processing continues until index i equals index k at decision block 57. Then, the method tests, at decision block 61, if the flow riding on the link connecting nodes $b_k$ and $b_{k+1}$ and terminating at node $b_k$ is greater than the temporary residual capacity of the link connecting nodes $b_k$ and $b_{k+1}$ or if the flow riding on the link connecting nodes $b_{k-1}$ and $b_k$ and terminating at node $b_k$ is greater than the residual capacity of the link connecting nodes $b_{k-1}$ and $b_k$. If so, the method lets node $b_k$ be an interchange point, at block 63 and processing returns. If not, the method places 1 ADM at node $b_k$ on layer 1, at block 65, and assigns the flow riding on the link connecting nodes $b_{k-1}$ and $b_k$ and terminating at node $b_k$ on layer 1 and reduces the residual capacity of that link by that amount of flow, and assigns the flow riding on link between nodes $b_k$ and $b_{k+1}$ and terminating at node $b_k$ on layer 1 and reduces the capacity of that link by that amount of flow, always indicated at block 67. Then, the method of the present invention tests, at decision block 69, if index k is equal to n. If not, the method lets k=k+1, at block 71, and processing returns to block 51. FIG. 4 processing continues until all nodes in the r-block have been processed, and all r-blocks have been processed. FIG. 4 processing assigns all flow not terminating at an interchange point to layer 1.

Referring again to FIG. 2, after the method has performed FIG. 4 processing, indicated generally at block 41, the method places one ADM on each of layers 1 and 2 at each interchange point, at block 73. Then, the method assigns unassigned flow to layer 2 until layer 2 capacity is exhausted and assigns the remaining flow to layer 1, at block 75. Thus, the method of the present invention assigns the flow terminating at each interchange point initially to layer 2. After the layer 2 capacity is exhausted, any additional flow is assigned to layer 1.

Figure 5:
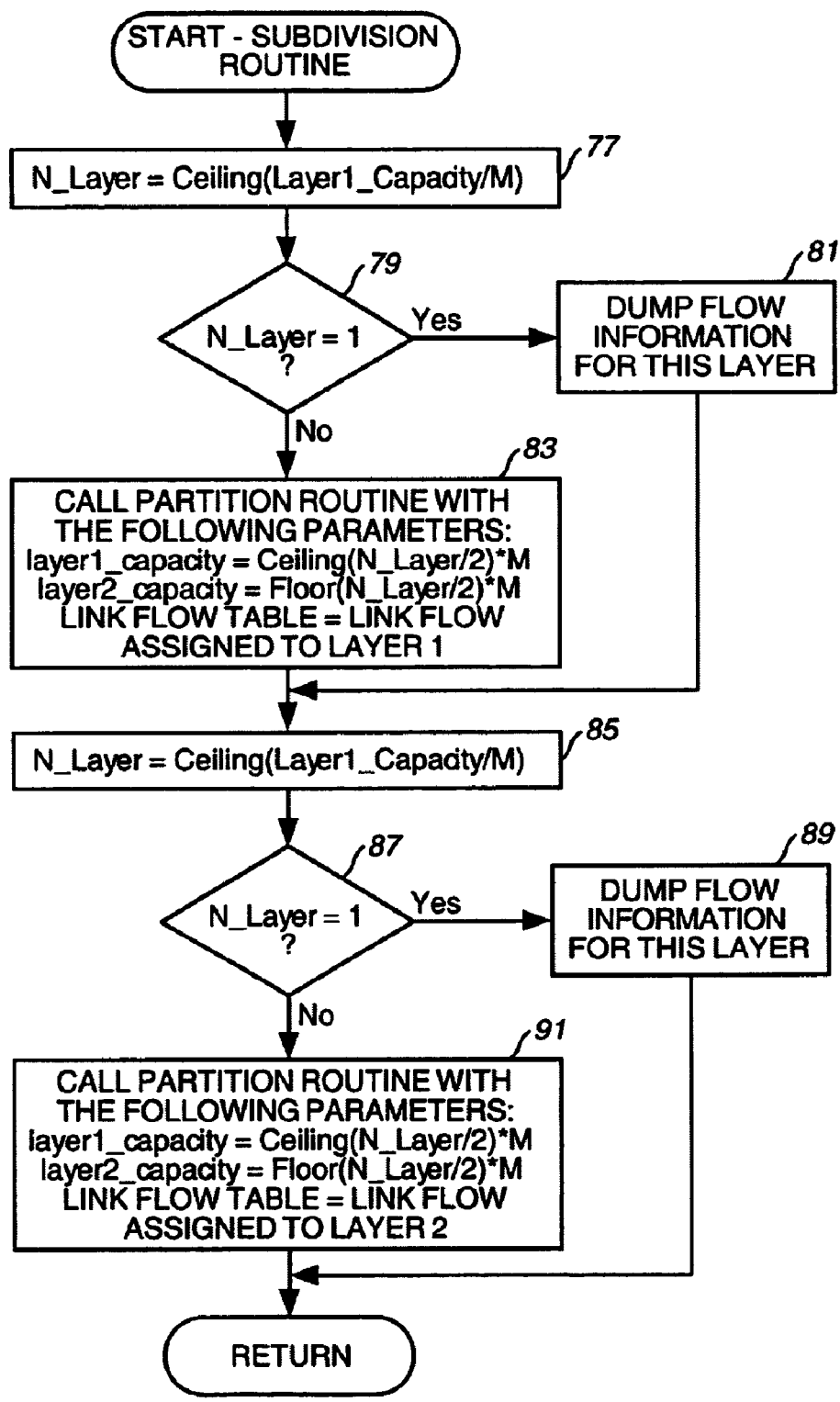
FIG. 5 is a flowchart of the subdivision routine of the present invention.

After completing the partition routine of FIG. 2, processing returns to perform the subdivision routine, as indicated generally at block 25 of FIG. 1 and shown in detail with respect to FIG. 5. Referring to FIG. 5, the method lets the number of layers be equal to the ceiling of the layer 1 capacity divided by the modularity, at block 77. The method then tests, at decision block 79, if the layer of capacity is equal to 1. If so, the method dumps the flow of information for this layer at block 81. If the number of layers determined at decision block 79 is not 1, then the method calls the partition routine with layer 1 capacity equalling the modularity of the ring multiplied by the ceiling of the number of layers calculated at block 77 divided by 2 and the layer 2 capacity being equal to the modularity of the ring multiplied by the floor of the number of layers calculated at block 77 divided by 2, as indicated at block 83. The partition routine called at block 83 uses the link flow table equal to the link flow assigned to layer 1 in the previous iteration of the process of the present invention. Then, the method calculates the number of layers equal to the ceiling of the layer 2 capacity divided by the modularity, at block 85. Then, the method tests, at decision block 87, if the number of layers is equal to 1. If so, the method dumps the flow information for this layer, at block 89, and processing ends. If the number of layers calculated at block 85 is not equal to 1, then the method calls the partition routine with layer 1 capacity equal to the modularity of the ring multiplied by the ceiling of the number of layers calculated at block 85 divided by 2 and the layer 2 capacity equal to the modularity of the ring multiplied by the floor of the number of layers calculated at block 85 divided by 2, at block 91. The partition routine called at block 91 uses for its link flow table the link flow assigned to layer 2 in the previous iteration. After calling the partition routine at block 91, processing returns.

From the foregoing, it may be seen that the present invention overcomes the shortcomings of the prior art. The method of the present invention gives top priority to minimizing the number of required ring layers. The method gives second priority to minimizing the total number of ADMs for the ring stack. The method gives third priority to minimizing the amount of traffic traversing between ring layers and minimizes the number of time slot changes when an internal time slot interchange function is not available.

The method of the present invention optimality determines the minimum number of ring layers. The method gives a solution with a worst case guarantee that the number of ADMs placed is never more than 150% of the theoretical minimum, which is not achievable under current technological limits. In practice, the algorithm achieves much better bounds for realistic data distributions. For the case where there is only a single ring layer, the method of the present invention gives a solution in which time slot interchange will occur only at a single node, with all other nodes requiring no time slot changes. The time slot change at the designated interchange node can be accomplished with drop and reinsert instead of a time slot interchange function. For the case that multiple ring layers are required, there is no time slot interchange within any single ring layer, with some traffic being transferred between different ring layers. However, in the worst case, a unit of traffic will traverse layers a number of times not greater than 50% of the number of nodes in the path. In practice, the worst case rarely happens and the amount of traffic that transfers between layers is kept to a minimum.

What is claimed is:

1. A method for partitioning traffic in a stacked ring network having a modularity, which comprises:
   dividing ring layers of the stacked ring network into a first set of layers and a second set of layers;
   determining interchange points between said first set of layers and said second set of layers, wherein an add/drop multiplexer is placed at each one of the interchange points and on said first set of layers at a terminating node that is not an interchange point;
   allocating said traffic between said first set of layers and said second set of layers; and
   subdividing each of said first and second sets of layers into two sets of layers, wherein the steps of dividing, determining, and allocating are repeated until each set of layers has one layer.

2. A method for partitioning traffic and placing add/drop multiplexers in a stacked ring network having a modularity, which comprises:
   determining a number of ring layers necessary to support traffic in said stacked ring network;
   dividing said number of ring layers into a first set of layers and a second set of layers;
   determining interchange points between said first set of layers and said second set of layers;
   placing one add/drop multiplexer on each set of layers at each interchange point;
   placing one add/drop multiplexer on said first set of layers at each terminating node of said ring network determined not to be an interchange point;
   allocating said traffic between said first set of layers and said second set of layers;
   subdividing each of said first and second sets of layers into two sets of layers; and
   repeating the steps of determining interchange points, allocating said traffic between sets of layers and subdividing each set of layers into two sets of layers until each set of layers consists of one layer.

3. The method in claim 2, wherein said step of allocating said traffic between said first set of layers and said second set of layers includes:

assigning traffic terminating at each said node determined not to be an interchange point to said first set of layers.

4. The method in claim 2, wherein allocating said traffic between said first set of layers and said second set of layers includes:

assigning traffic terminating at each said interchange point to said second set of layers until the capacity of said second set of layers is exhausted; and, assigning remaining traffic terminating at each said interchange point to said first set of layers after said capacity of said second set of layers is exhausted.

5. The method in claim 1, wherein said step of determining the number of ring layers necessary to support said traffic includes:

dividing the capacity required to support said traffic by the modularity of said ring.

6. The method in claim 1, wherein said number of ring layers necessary to support said traffic is equal to the ceiling of the capacity required to support said traffic divided by the modularity of said ring.

7. The method in claim 1, including the step of determining the respective capacities of said first and second sets of layers.

8. A method for partitioning traffic and placing add/drop multiplexers in a stacked ring network having a modularity, which comprises:

determining a number of ring layers necessary to support traffic in said stacked ring network;

dividing said number of ring layers into a first set of layers and a second set of layers;

determining interchange points between said first set of layers and said second set of layers;

determining the respective capacities of said first and second sets of layers, wherein said capacity of said first set of layers is equal to the ceiling of half said number of layers in said first set multiplied by the modularity of said ring network, and, said capacity of said second set of layers is equal to the floor of half said number of layers in said second set multiplied by the modularity of said ring network;

allocating said traffic between said first set of layers and said second set of layers;

subdividing each of said first and second sets of layers into two sets of layers; and repeating the steps of determining interchange points, allocating said traffic between sets of layers and subdividing each set of layers into two sets of layers until each set of layers consists of one layer.

9. The method in claim 8, wherein said step of determining interchange points between said first set of layers and said second set of layers includes the step of:

determining for each node of said ring network if the traffic terminating at said node is greater than the capacity of one of said sets of layers.

10. The method in claim 8, wherein said step of determining interchange points between said first set of layers and said second set of layers includes:

determining for each node of said ring network if the traffic terminating at said node is greater than the capacity of said first set of layers.

11. A method of partitioning traffic in a stacked ring network, which comprises:

dividing ring layers of the stacked ring network into a first set of layers and a second set of layers;

determining interchange points between said first set of layers and said second set of layers, wherein, for each interchange point, a set of nodes between said interchange points and an adjacent interchange point is determined for placement of an add/drop multiplexer at one of the nodes in the set; and allocating said traffic between said first set of layers and said second set of layers.

12. The method in claim 11, wherein determining the number of ring layers necessary to support said traffic includes:

dividing a capacity required to support said traffic by a modularity of said ring network.

13. The method in claim 11, wherein said number of ring layers necessary to support said traffic is equal to a ceiling capacity required to support said traffic divided by a modularity of said ring network.

14. The method in claim 11, including the step of determining respective capacities of said first and second sets of layers.

15. A method of partitioning traffic in a staked ring network having a modularity, which comprises:

determining a number of ring layers necessary to support traffic in a stacked ring network;

dividing said ring layers into a first set of layers and a second set of layers;

determining interchange points between said first set of layers and said second set of layers;

determining respective capacities of said first and second sets of layers, wherein said capacity of said first set of layers is equal to a ceiling capacity of half of said number of layers multiplied by a modularity of said ring network, and said capacity of said second set of layers is equal to a floor capacity of half of said number of layers multiplied by the modularity of said ring network; and allocating said traffic between said first set of layers and said second set of layers.

16. The method in claim 15, wherein determining interchange points between said first set of layers and said second set of layers includes:

determining for each node of said ring if traffic terminating at said node is greater than the capacity of one of said sets of layers.

17. The method in claim 15, wherein determining interchange points between said first set of layers and said second set of layers includes:

determining for each node of said ring if traffic terminating at said node is greater than said capacity of said first set of layers.

18. A method of partitioning traffic in a stacked ring network having a modularity, which comprises:

determining a number of ring layers necessary to support traffic in a stacked ring network;

dividing said ring layers into a first set of layers and a second set of layers;

determining interchange points between said first set of layers and said second set of layers; and allocating said traffic between said first set of layers and said second set of layers, the allocating step including, for each interchange point, defining an r-block as a set of nodes between said interchange point and an adjacent interchange point.

19. The method in claim 18, wherein allocating said traffic between said first set of layers and said second set of layers includes:

placing one add/drop multiplexer at a first node of said r-block adjacent to said interchange point on said first set of layers; and, assigning to said first set of layers traffic terminating at said first adjacent node.

20. The method in claim 19, including:

reducing capacity of links connecting said first adjacent node to adjacent nodes by an amount of traffic terminating at said first adjacent node.

21. The method in claim 20, including:

placing one add/drop multiplexer on said first set of layers at a next node of said r-block adjacent to said first adjacent node; and, assigning to said first set of layers traffic terminating at said next adjacent node.

22. The method in claim 20, including:

letting a next node of said r-block adjacent said first adjacent node be an interchange point if traffic terminating at said next adjacent node is greater than a reduced capacity of said links connecting said first adjacent node and said next adjacent node.

23. A method of partitioning traffic in a stacked ring network, the method comprising:

partitioning ring layers of the stacked ring network into a first set of layers and a second set of layers;

determining interchange points between the first set of layers and the second set of layers;

assigning add/drop multiplexers at the interchange points on each set of layers; and assigning, within the first set of layers, an add/drop multiplexer at each terminating node that is not an interchange point.

24. A method of partitioning traffic in a stacked ring network, the method comprising: dividing ring layers of the stacked ring network into a first set of layers and a second set of layers;

determining interchange points between said first set of layers and said second set layers;

allocating said traffic between said first set of layers and said second set of layers; and iteratively performing the steps of dividing, determining, and allocating until each of the set of layers includes only a single layer.

* * * * *